US008683985B2

(12) United States Patent
Thomson

(10) Patent No.: US 8,683,985 B2
(45) Date of Patent: Apr. 1, 2014

(54) BELTED GEAR ASSEMBLY FOR DRIVING A SUPERCHARGER

(75) Inventor: Stephen J. Thomson, Hill, NH (US)

(73) Assignee: Stephen J. Thomson, Hill, NH (US)

( * ) Notice: Subject to any disclaimer, the term of this patent is extended or adjusted under 35 U.S.C. 154(b) by 355 days.

(21) Appl. No.: 13/160,074

(22) Filed: Jun. 14, 2011

(65) Prior Publication Data

US 2011/0303198 A1 Dec. 15, 2011

Related U.S. Application Data

(60) Provisional application No. 61/354,511, filed on Jun. 14, 2010.

(51) Int. Cl.

| | |
|---|---|
| ***F02B 33/00*** | (2006.01) |
| ***F01D 25/18*** | (2006.01) |
| ***F01M 1/00*** | (2006.01) |
| ***F02D 23/02*** | (2006.01) |
| ***F16H 57/02*** | (2012.01) |
| ***F02B 33/38*** | (2006.01) |
| ***F02B 39/04*** | (2006.01) |
| ***F02B 39/14*** | (2006.01) |
| *F02D 41/00* | (2006.01) |
| *F02D 41/34* | (2006.01) |

(52) U.S. Cl.

CPC .................. *F02B 33/38* (2013.01); *F02B 39/04* (2013.01); *F02B 39/14* (2013.01); *F02D 2200/0406* (2013.01); *F02D 2400/11* (2013.01); *F02D 41/0007* (2013.01); *F02D 41/34* (2013.01)

USPC ..... 123/559.1; 184/6.12; 184/6.16; 184/11.1; 184/13.1; 74/607

(58) Field of Classification Search

CPC .......... F02B 33/38; F02B 39/04; F02B 39/14; F02D 2200/0406; F02D 2400/11; F02D 41/0007; F02D 41/34

USPC .................. 123/559.1, 55.5, 55.7; 418/206.5; 74/607; 184/6.12, 6.16, 11.1, 13.1

IPC ........................................................ F02D 23/02

See application file for complete search history.

(56) References Cited

U.S. PATENT DOCUMENTS

| | | | | | |
|---|---|---|---|---|---|
| 3,115,714 | A | * | 12/1963 | Johann | 37/250 |
| 3,664,099 | A | * | 5/1972 | Chouinard | 56/13.3 |
| 4,408,994 | A | * | 10/1983 | Blanchard | 440/53 |
| 5,263,463 | A | * | 11/1993 | Perry | 123/559.1 |
| 5,460,145 | A | * | 10/1995 | Perry, Jr. | 123/559.1 |
| 6,105,558 | A | * | 8/2000 | Bushling | 123/559.1 |

(Continued)

*Primary Examiner* — Thai Ba Trieu

(74) *Attorney, Agent, or Firm* — Michael J. Persson

(57) ABSTRACT

A belted gear assembly for driving a supercharger includes a belt drive assembly for operatively connecting a gear drive assembly to an existing pinion shaft of an engine. The belt drive assembly includes a lower pulley assembly that is operatively connected to the pinion shaft and belted to an upper pulley assembly. The upper pulley assembly is operatively connected to a side gear of the gear drive assembly. The side gear engages an upper gear of the gear drive assembly, which is operatively connected to a lobe of the supercharger. Rotation of the upper gear thereby initiates rotation of the supercharger. The amount of boost provided to the supercharger is readily adjustable by simply changing the lower pulley assembly to adjust the RPM ratio for the supercharger. Each component of the belted gear assembly is isolated and fully self-contained, including a separate lubrication system and collection well.

10 Claims, 12 Drawing Sheets

(56) References Cited

U.S. PATENT DOCUMENTS

| | | | | |
|---|---|---|---|---|
| 6,241,498 | B1 * | 6/2001 | Hansen et al. | 123/559.1 |
| 6,454,552 | B1 * | 9/2002 | Hansen et al. | 418/206.5 |
| 7,108,089 | B2 * | 9/2006 | Hanafusa et al. | 180/65.245 |
| 7,549,493 | B1 * | 6/2009 | Jones | 123/559.1 |
| 8,286,604 | B2 * | 10/2012 | Kihara et al. | 123/185.14 |
| 2011/0253081 | A1 * | 10/2011 | Gaiser | 123/56.3 |
| 2011/0253082 | A1 * | 10/2011 | Gaiser | 123/56.3 |
| 2012/0073403 | A1 * | 3/2012 | Perakes et al. | 74/607 |

* cited by examiner

BELTED GEAR ASSEMBLY FOR DRIVING A SUPERCHARGER

RELATED APPLICATIONS

This application claims the benefit of U.S. Provisional Application Ser. No. 61/354,511, filed Jun. 14, 2010, entitled BELTED GEAR ASSEMBLY FOR DRIVING A SUPERCHARGER, the entire disclosure of which is herein incorporated by reference.

FIELD OF THE INVENTION

The present invention relates to an assembly for driving a supercharger, and related systems and methods.

BACKGROUND OF THE INVENTION

For a two-cycle or four-cycle internal combustion engine, in operation, air is introduced to the fuel for proper combustion. A motorcycle, snowmobile, or other motorized vehicle having a fuel injection or carburetion system, includes appropriate ducting to introduce air into the fuel to create an adequate air/fuel mixture for combustion. A conventional motorcycle, as shown in FIG. 1, includes an air breather 110 which provides air for the fuel combustion. The air breather 110 provides the sole intake of air into the fuel system of the engine. Note a cover plate 120 is conventionally provided on a motorcycle, which covers the crank pulley and crank shaft for the engine. There are bolts 130 provided for securing the cover plate 120 to the motorcycle. A filter may also be located within the air breather assembly.

To improve performance of the engine, including providing additional torque, horsepower, or other enhancements, modifications or additions can be provided for an engine. For example, for increasing the pressure (psi or "boost") of air distributed into the fuel system to enhance performance, a supercharger may be provided. A supercharger (or "blower" as known in the art) forces more air and fuel into the cylinders of the engine. One current technique for integrating a supercharger into a motorcycle engine is to provide a purely gear-driven assembly that interconnects directly to the motor. This requires extensive integration within the motor and a significant amount of time and cost, generally at a specialized shop to install the supercharger and associated gearing assembly. In a conventional implementation, such a purely geared assembly typically requires a large number of gears, increasing the cost as well as increasing the chances of malfunction. This setup also employs the same lubrication system as the engine itself which increases the chance of oil loss and increases the complexity of the lubrication system. Gears are notoriously unforgiving of sudden impulses or acceleration. This increases the likelihood of a snapped shaft, gear tooth, or other component during operation. Accordingly, a severe disadvantage of this integrated type of purely geared system is that if or when it breaks, the entire engine is also destroyed.

The purely geared drive assembly is also not readily adjustable once integrated into a motor without having to modify the internal gears and integration within the motor. This disadvantageously fixes the amount of boost or air flow that is directed into the fuel system of the internal combustion engine to create the air/fuel mixture. Moreover, such a system requires extensive and continual repairs and down time, where a user cannot enjoy the motorcycle, each instance a change is desired. These systems also typically are most efficient at very high RPMs, which makes it impractical for efficient use at low and midrange RPMs.

Moreover, most available small-vehicle/motorcycle superchargers are an impeller/turbine type. These units generate significantly less boost than the popular roots rotor design. However, a roots supercharger has a form-factor that limits its use on a motorcycle, since in its normal orientation, the rotor axes are horizontal to interconnect with a parallel crankshaft via a belt or gears. All these challenges render the reliable supercharging of a motorcycle or other riding vehicle somewhat problematic.

It is desirable to avoid these and other disadvantages by providing a modular, self-contained, externally mounted supercharger drive assembly.

SUMMARY OF THE INVENTION

The disadvantages of the prior art are overcome by providing a gear drive assembly housing for driving a roots rotor type supercharger having its rotor axes oriented vertically. The vertical rotors are driven by a horizontal motor crankshaft via a pair of bevel gears that are belt-driven from a pulley operatively connected to the crank shaft. In an embodiment, the gear assembly housing is a modular, bolt-on device, externally mounted on the engine and can be bolted to the side of a motor cycle engine, for example. Additionally, the gear assembly housing is fully contained, in that it includes its own lubrication system, and moreover, in the event of a malfunction or breakdown of gear assembly components, the assembly housing will be the only component to suffer damage, as it remains completely isolated from the engine in terms of internal components and lubrication system (i.e. the oil reservoir). Moreover, if the drive assembly malfunctions for any reason, the belt will either slip or break, and there will be no damage to the motor. Thus, any damage to the supercharger or drive assembly will not result in the motorcycle being unusable, as the motor will still function properly.

In an illustrative embodiment, the belt drive assembly for the gear drive assembly is readily adjustable by merely changing the lower pulley that is operatively connected to the crank shaft. Changing the lower pulley advantageously, and relatively easily, allows modification of the amount of boost delivered by the supercharger by altering the speed at which the bevel gears rotate. A motor need not be modified to change the amount of boost, but rather a quick pulley change can be performed. This advantageously reduces the cost of maintenance and modifications, and significantly reduces the amount of time required to perform the maintenance.

The gear assembly housing illustratively includes a pair of bevel gears that are engaged to provide a right-angle drive, and the belted drive assembly has one of the bevel gears operatively connected thereto, which engages the second bevel gear, operatively connected to the supercharger. Accordingly, the supercharger is belt driven through interconnectivity with the crank shaft, via belt drive assembly and gear drive assembly.

The gear assembly housing can include a plurality of cooling fins, blades, or other appropriate surface formations (grooves, etc.) along the exterior surface of the housing, to lighten the housing, increase aesthetics, and provide a heat sink to dissipate heat. The belted drive assembly is protected by an outer cover, which encloses the upper pulley operatively connected to the gear drive assembly, the belt, and the lower pulley operatively connected to the engine crank. The shape and design of the protective cover can be constructed and arranged as desired to achieve a particular look or appearance for the motorized vehicle.

An auxiliary fuel system can be provided to further enhance performance of the supercharger by ensuring adequate fuel is provided to the engine at the outlet of the supercharger. This forces sufficient gas to the engine intake along with the boost output from the supercharger. The auxiliary fuel system incorporates a manifold absolute pressure (MAP) sensor that reads the pressure at the outlet of the supercharger to determine the amount of boost being driven into the engine intake. This determines the amount of fuel to be provided by an auxiliary fuel injector to the engine intake at the outlet of the supercharger. Accordingly, the precise amount of fuel delivered to the engine intake can be fine-tuned based upon the precise amount of boost being output by the supercharger. This further improves the efficiency of the system

BRIEF DESCRIPTION OF THE DRAWINGS

The invention description below refers to the accompanying drawings, of which.

DETAILED DESCRIPTION

A belted gear assembly for driving a supercharger improves the performance of an internal combustion engine, and furthermore provides an adjustable and fully self-contained housing for driving a vertically aligned supercharger. It is noted that as used herein, the term "gear drive assembly" and its housing refers to the elements and associated interconnections between the supercharger and a pair of gears disposed within the gear drive housing. The gear drive assembly comprises the elements and components for driving the supercharger from an upper (or side) external pulley operatively connected to one gear in communication with a side gear in communication with the gear of the supercharger. The term "belted drive assembly" refers to the elements and associated interconnections for the belted connection between the pinion shaft (or other appropriate interconnection such as an engine's cam shaft) of the motor and the gear drive assembly. The belted drive assembly includes the external pulleys (upper and lower) and the belted interconnection therebetween, which drives the gear drive assembly from the pinion shaft or crank shaft of the motor.

Figure 2:
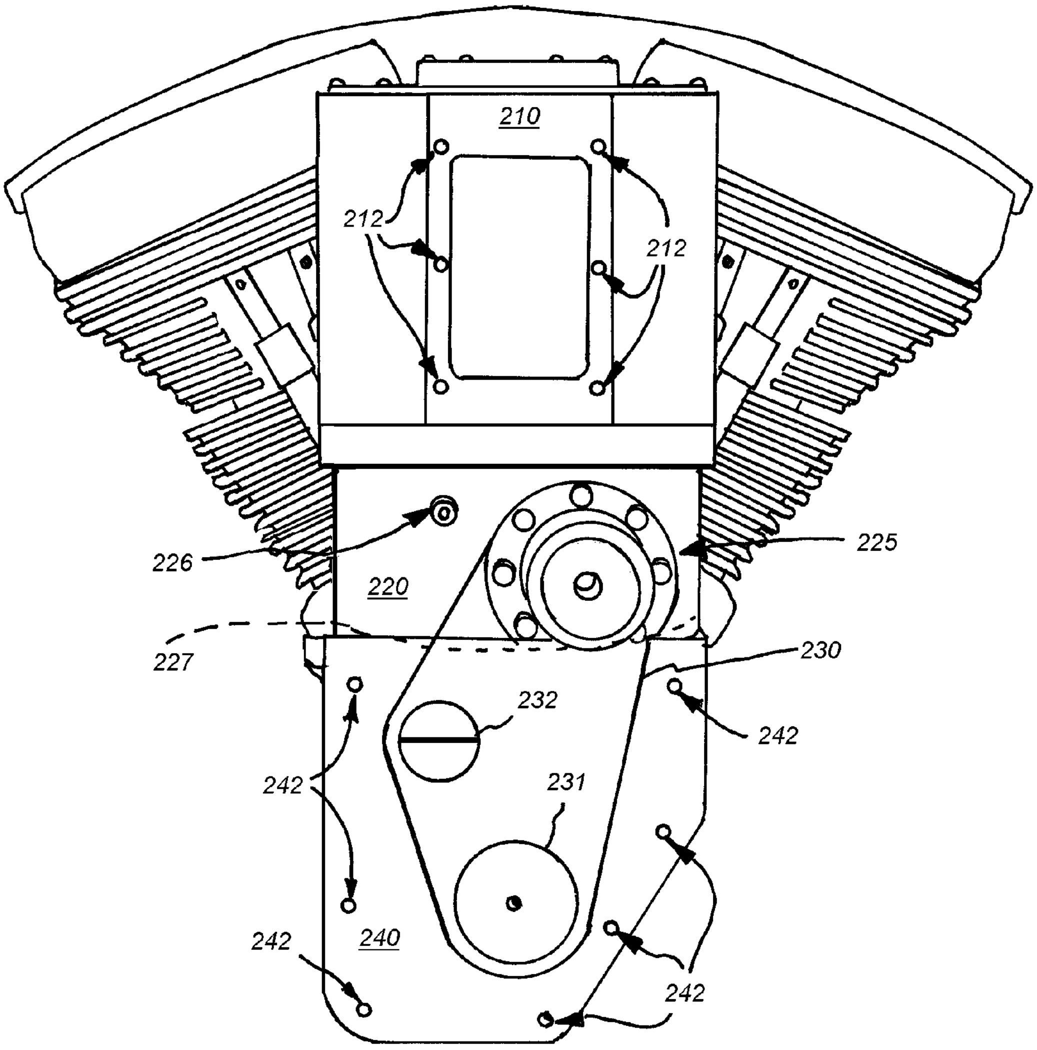
FIG. 2 is a front view of a gear drive assembly housing mounted on the side of a motorcycle with intake to fuel system in communication with a supercharger, including a belted interconnection between the gear drive assembly, according to an illustrative embodiment.

Reference is now made to FIGS. 2-5 showing a supercharger 210, a gear drive assembly housing 220, a lower belt drive assembly housing 240 and the associated components and interconnections therebetween. More particularly, FIG. 2 shows a conventional roots style supercharger 210 mounted on the side of a motorcycle engine. The roots type superchargers include a pair of counter-rotating meshed lobed rotors to promote air flow into the engine intake. The rotors (510, 511 shown in FIG. 5) trap air in the gaps between the rotors and efficiently force the air against the housing as they rotate towards the outlet (air intake for the engine, see intake 430 of FIG. 4). According to an illustrative embodiment, the supercharger 210 can be based upon the Hampton Super II rotor design, available from Hampton Blowers of Downey, Calif. In this design, the rotor lobes 508, 509 are approximately 3-4 inches in diameter, and are 3.5 inches according to the illustrative embodiment. However, the actual size and rotor layout is highly variable depending on the supercharger manufacturer, the desired performance or appearance, and the size of the engine to which the supercharger is attached, all of which are readily apparent to those having ordinary skill.

Figure 1:
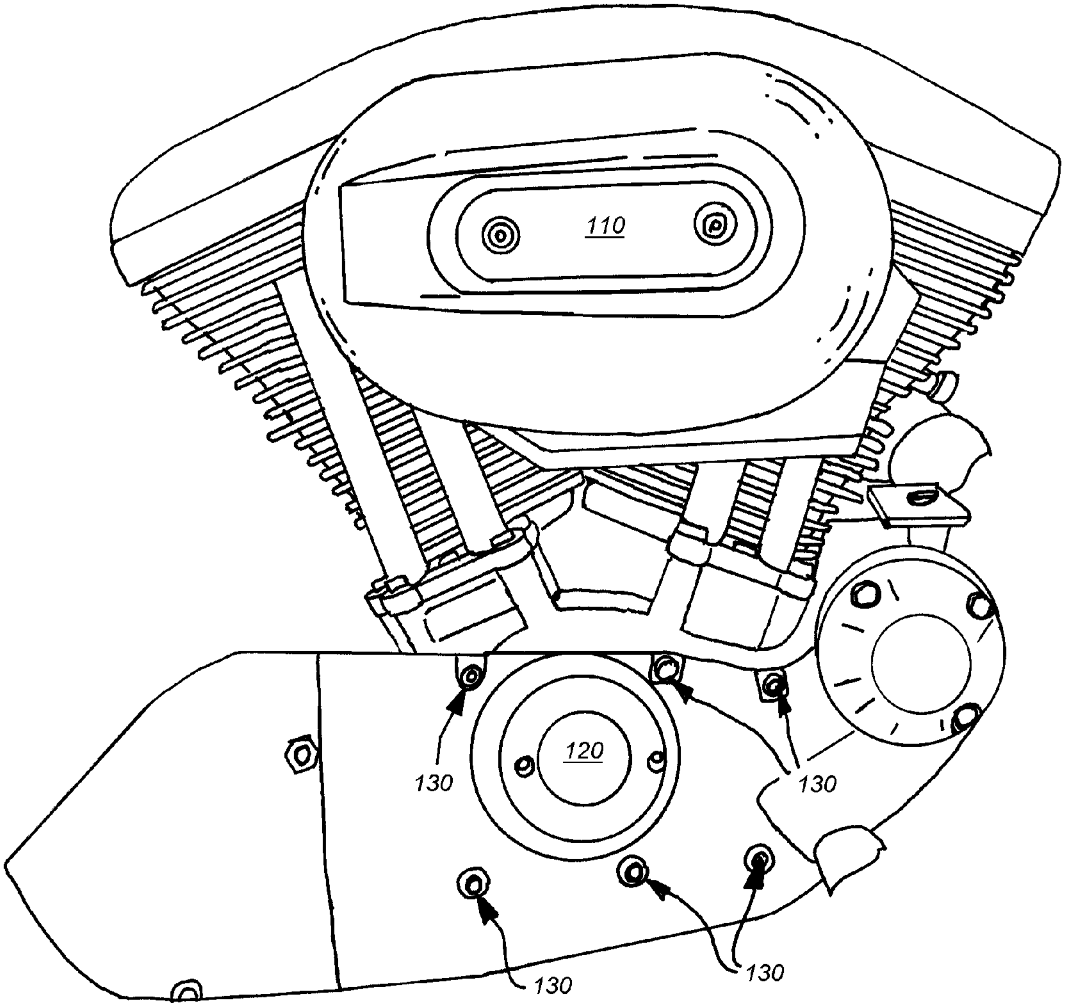
Fig. 1 (Prior Art)
FIG. 1, already described, is a side view of an exemplary conventional motorcycle including a frontal view of its air breather and crank pulley cover, according to a prior art embodiment.
Figure 12:
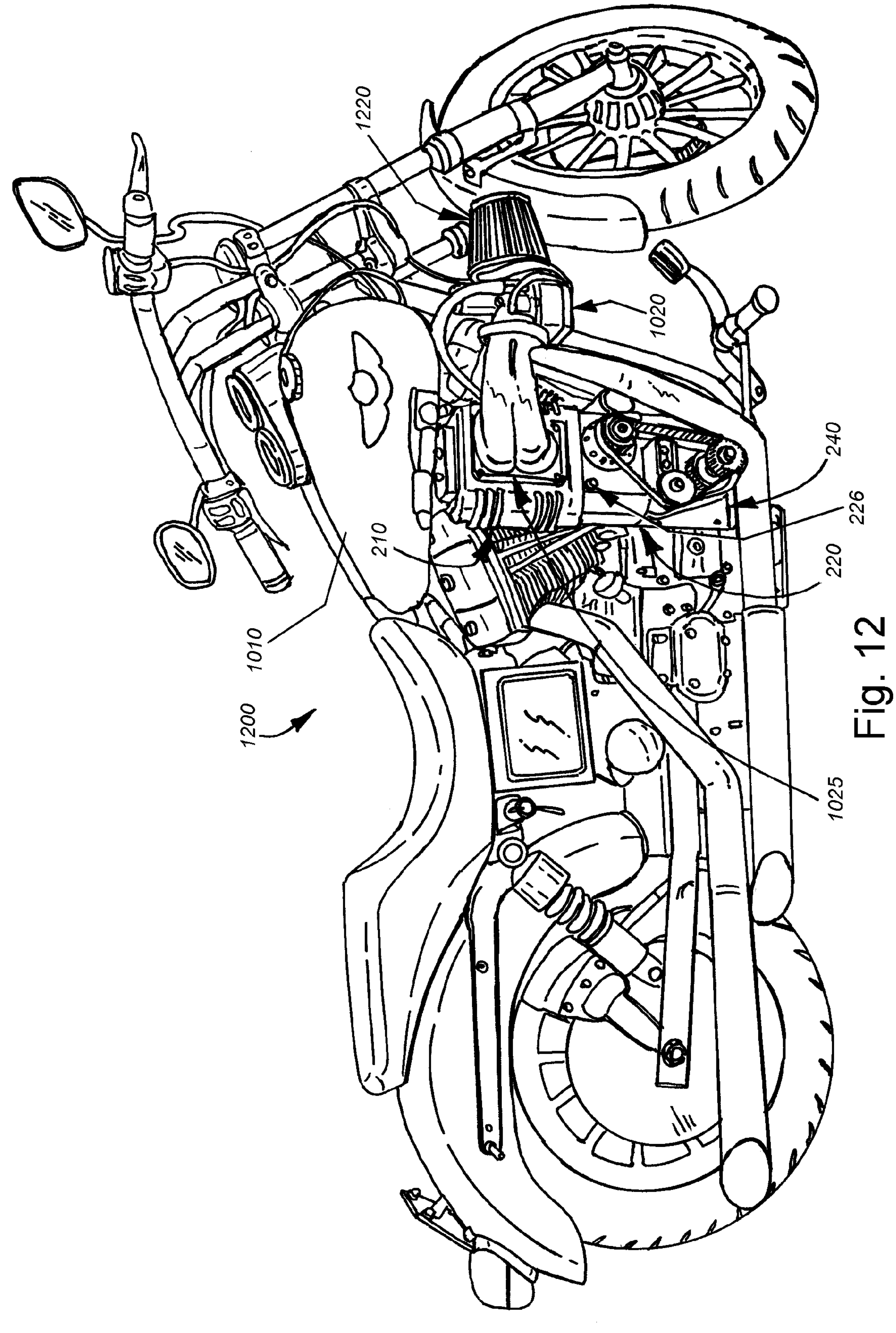
FIG. 12 is a side view of a motorcycle having the supercharger and belted gear assembly mounted thereon, in accordance with the illustrative embodiments.

Note that the supercharger 210 has been placed where the conventional air breather 110 (FIG. 1) is present on a motorcycle for air intake into the fuel system. An air cleaner (see air cleaner 1220 of FIG. 12 for example) is likewise provided for the supercharger 210, and can be operatively connected through an intake (see intake 1025 of FIGS. 10 and 12) that can be bolted onto the supercharger via appropriate bolt holes 212. Refer to FIG. 12 for an illustrative embodiment of the completely assembled supercharger and gear drive assembly.

Figure 4:
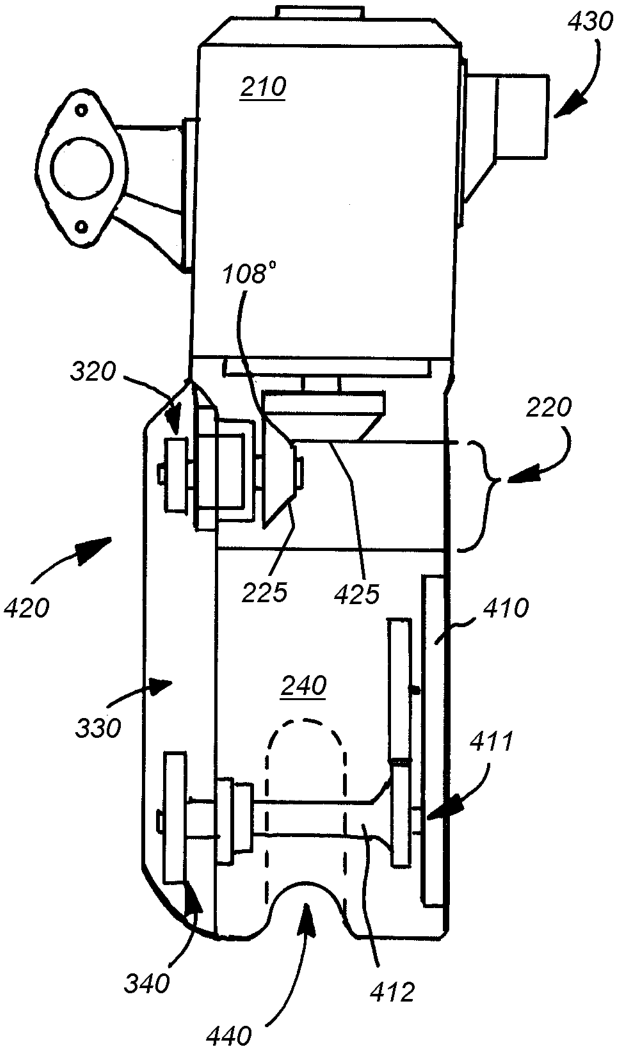
FIG. 4 is a partially exposed side view of the overall belted gear assembly of FIG. 2 including the supercharger, gear drive assembly housing, and belted drive assembly, showing the engagement of the gears within the gear drive assembly housing, according to the illustrative embodiment.
Figure 5:
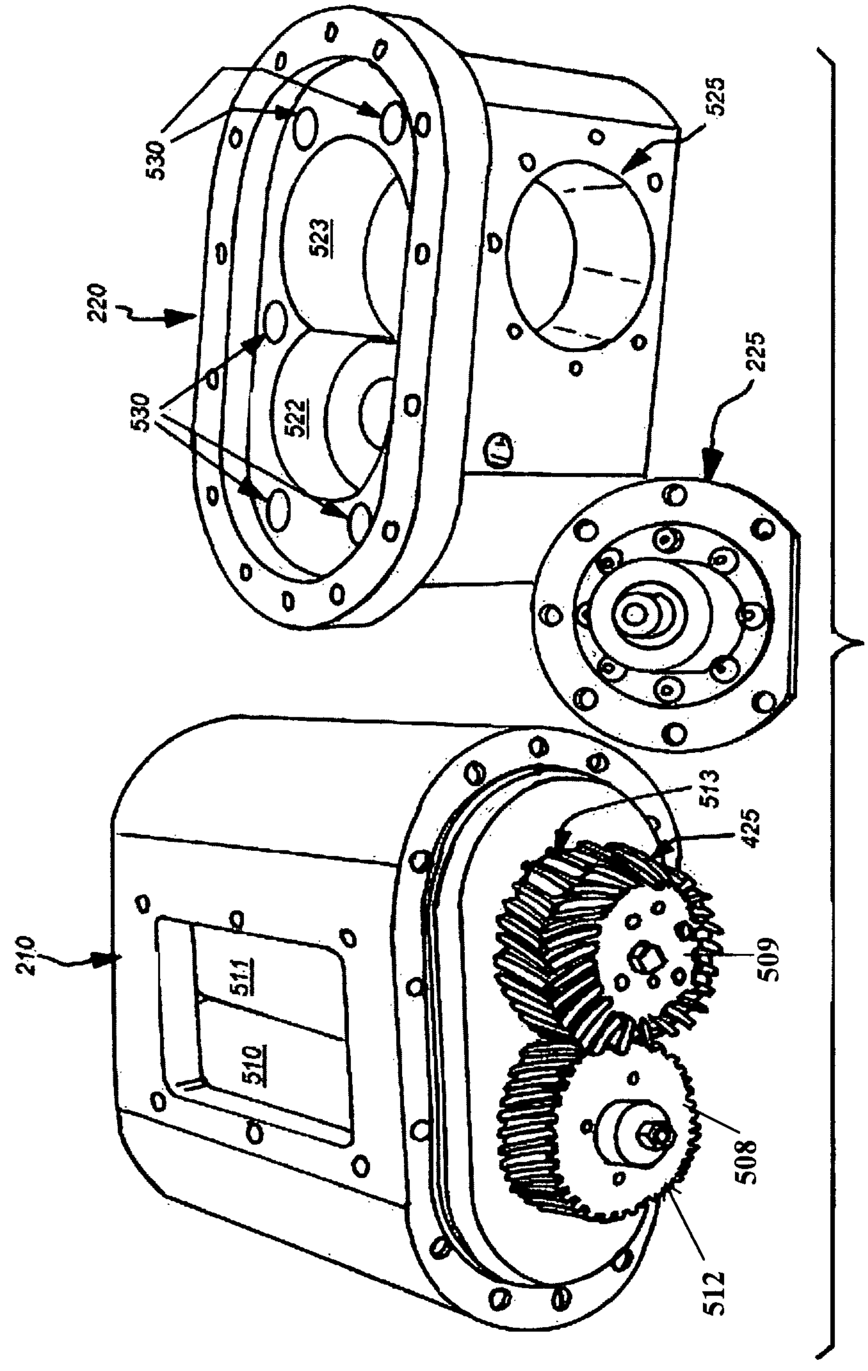
FIG. 5 is an exploded view of the supercharger, gear drive assembly housing of FIG. 2 including attached upper bevel gear, and side bevel gear, according to the illustrative embodiment.

According to the illustrative embodiment, as shown in FIG. 5, a gear drive assembly housing 220 is mounted to the underside of the supercharger 210 such that the gears 512, 513 of the supercharger 210 nest within the recesses 522, 523 of the drive assembly housing 220. The gear drive assembly housing 220 can include a plurality of holes 530 to provide for cooling within the housing. The shape, spacing and location of these holes is highly variable within ordinary skill. Referring back to FIG. 2, the gear drive assembly housing 220 is constructed and arranged to retain a side bevel gear assembly 225. The gear drive assembly housing 220 is fully self-contained and includes a pressure relief valve 226 for draining excess oil or other lubricating agent within the housing 220. Specifically, the dashed line 227 is a flat sealed end of the housing which fully contains the components therein. The side bevel gear assembly 225 is belt driven (line 230) from a lower pulley (circle 231) that is rotationally integrated with the engine crank shaft. A tensioner (circle 232) can also be provided to compensate for varying the diameter or size of the lower pulley. Notably, varying pulley size allows the user to easily adjust the level of boost produced by the supercharger 210 (by changing the relative rotation per minute (RPM) ratio at which it is driven by the engine). Although not shown in FIG. 2, a cover can be provided over the belted drive assembly to protect the contents therein, and secured to the lower belt drive assembly housing 240 via bolts (not shown) applied to appropriate bolt holes 242 (or other fastening mechanisms). See, for example, the cover 420 shown in FIG. 4.

Although not shown, the exterior surface of the supercharger 210 and gear drive assembly housing 220 can include a plurality of parallel grooves, cooling fins or blades, or other appropriate grooves. These grooves serve to lighten the housing, as well as providing a heat sink to dissipate heat. They also allow for an aesthetic decoration.

Figure 3:
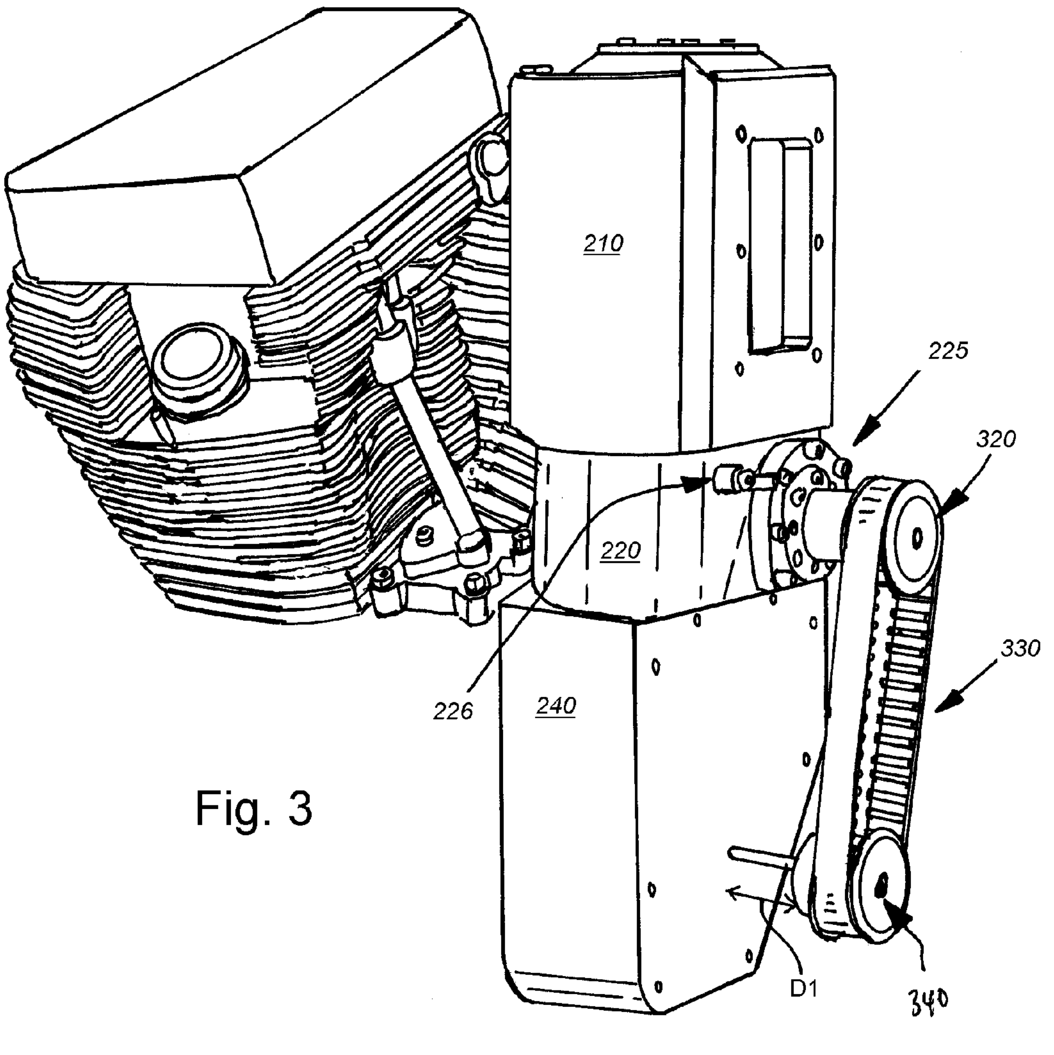
FIG. 3 is a frontal perspective view of the gear drive assembly housing of FIG. 2 with a prototypical pulley and associated belt mounted thereon, the gear drive assembly housing being belt-driven by the lower pulley that is operatively connected to a pinion shaft of the motor, according to the illustrative embodiment.

FIG. 3 shows an illustrative arrangement of pulleys for the belted drive assembly, including an upper pulley 320, a belt 330 for the belted drive and a prototypical lower pulley 340. It is noted that in this prototypical example the pulley 340 is displaced at a distance D1 from the housing 240 of approximately ½ inch-4 inches. The displacement D1 can be reduced or increased as desired to provide proper clearance and design implementations for the motorcycle. The pulleys used are highly variable and in an illustrative embodiment accommodate a belt of approximately 8 mm in width, and can vary to accommodate any appropriate belt size.

The interconnectivity of the system is shown in greater detail in the cross-sectional view of FIG. 4. The lower pulley 340 is rotationally integrated and operatively connected to the engine through the cam plate 410 having pinion shaft 411. Note that this is one available arrangement for a type of motorcycle such as a twin cam, and these teachings and arrangements can be appropriately modified to accommodate for differing types and styles of motorcycles and/or engines. Moreover, although the pulley is shown and described as being rotationally integrated with the pinion shaft in this embodiment, other interconnections can be provided for other motorcycles and/or motorcycle engines such as a connection to the cam shaft instead of the pinion shaft. The cam shaft rotates in an opposing direction and thus the pulley arrangement can be reversed so that the drive elements are operatively connected to the opposing lobe of the supercharger to account for the differing motorcycle arrangement. For example, the supercharger on a Twin Cam motorcycle is driven by the pinion shaft while the supercharger of a V-Rod is driven by the cam shaft. A driveshaft 412 is provided for the lower pulley belted drive assembly. Additionally, the cover 420 is shown in FIG. 4 which protects the upper pulley 320, belt 330 and lower pulley 340. The cover can be any appropriate shape or size and is highly variable to achieve desired shape to accommodate a particular vehicle, or a particular aesthetic appearance. The cover can be secured, for example, to housing 240 via holes 242 (see FIG. 2). The housing 240 can include an appropriate notch 440 to provide the clearance desired for the exhaust of a motorcycle engine, for example.

Figure 6:
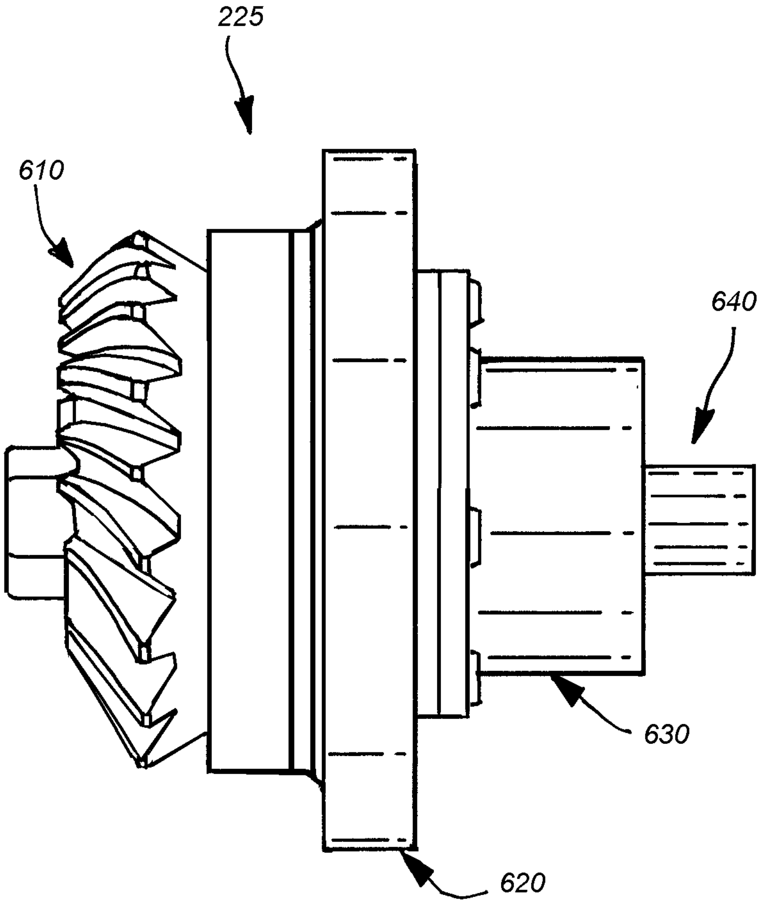
FIG. 6 is a side view of the side bevel gear shown in FIG. 5, including bevel gear carrier, according to the illustrative embodiment.

As shown in FIG. 4, the upper pulley 320, being belt driven by the lower pulley (and engine crank shaft or cam shaft), is operatively connected to the side gear assembly 225. In turn, the side gear assembly 225 is engaged with the upper gear assembly 425 to drive the supercharger 210. The side gear assembly 225 is shown in greater detail in FIG. 6, showing the bevel gear 610 having bevel teeth that engage with respective bevel teeth of the upper gear assembly 425. The side gear assembly 225 includes a carrier 620 to secure the gear assembly 225 to the gear assembly housing 220 (as the gear assembly 225 seats within the recess 525 in the side of the housing 220—see FIG. 5). A spacer 630 can be provided for the gear assembly 225 such that a pulley which rests on the shaft 640 is appropriately displaced from the housing 220.

In further embodiments the supercharger and associated interconnections can be provided as a dual-supercharger arrangement to provide further boost to the engine intake. According to a dual-supercharger arrangement, the pulleys and interconnected gears can be arranged as appropriate to achieve the desired supercharging effect of one supercharger per cylinder. For example, the gear assembly can be operatively connected to the opposing lobe of the supercharger depending on the rotation of the shaft, as described in greater detail hereinabove. If operatively connected to the pinion shaft which rotates in one direction one lobe is connected to the gear assembly and if being driven by the cam shaft, which rotates in another direction, an opposing lobe of the supercharger will be connected thereto to account for the opposing direction of rotation.

Figure 7:
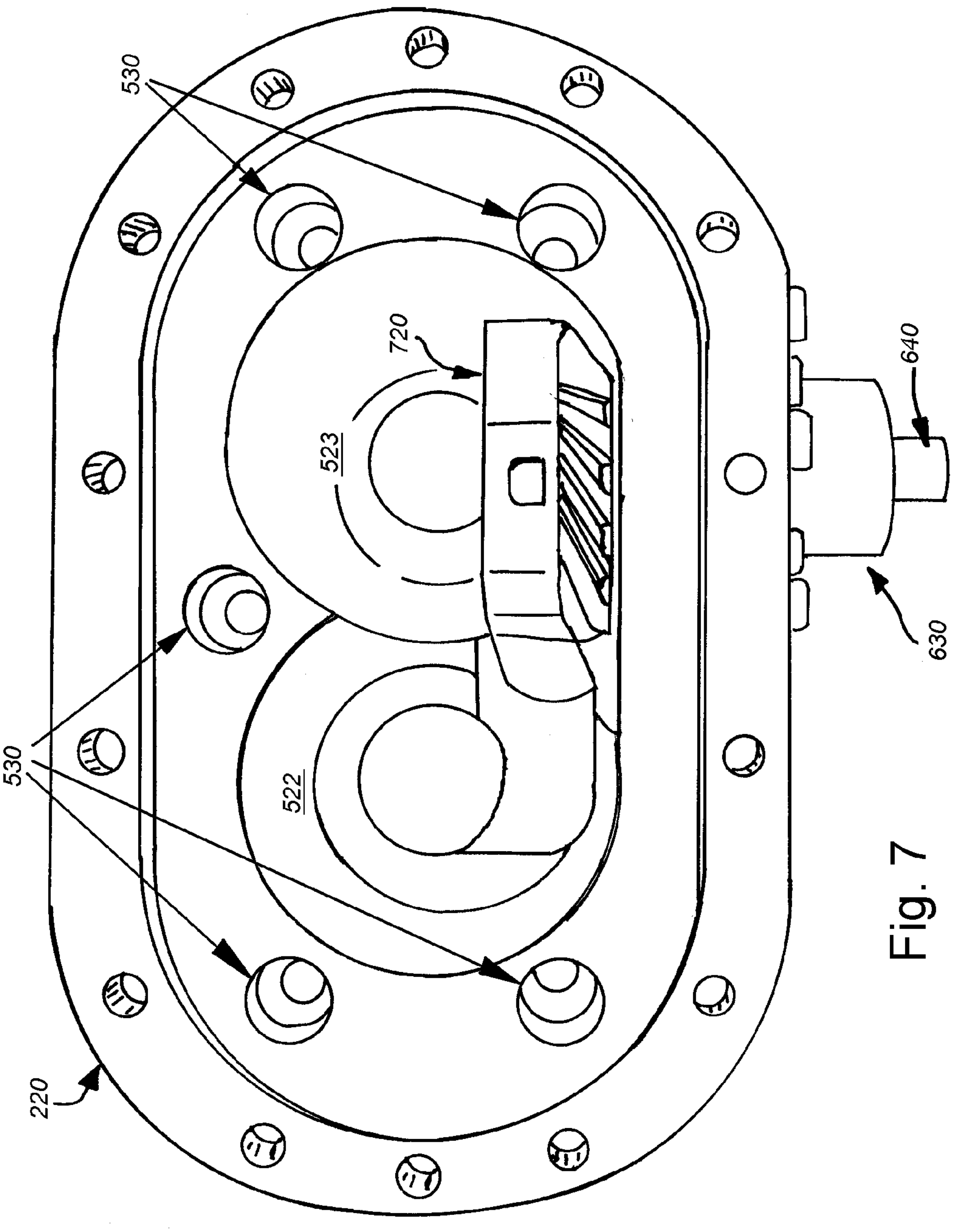
FIG. 7 is a top view of the gear drive assembly housing shown in FIG. 5, detailing an oil collection well within the overall housing interior that ensures proper lubrication of the gears within the gear drive assembly housing, according to the illustrative embodiment.

Referring now to FIG. 7, in an illustrative embodiment, the gear drive assembly housing 220 includes a collection well 720 constructed and arranged to retain a lubricating agent (i.e. gear oil) therein, regardless of the orientation of the engine. Moreover, the collection well 720 ensures that the gear assemblies 225 and 425 are properly lubricated, even if the engine orientation is changed. For example, a motorcycle is frequently tipped from side-to-side while driving to turn the vehicle, and thus so is the engine. Therefore, the collection well 720 effectively prevents starvation of oil in the event it is tipped significantly.

Figure 8:
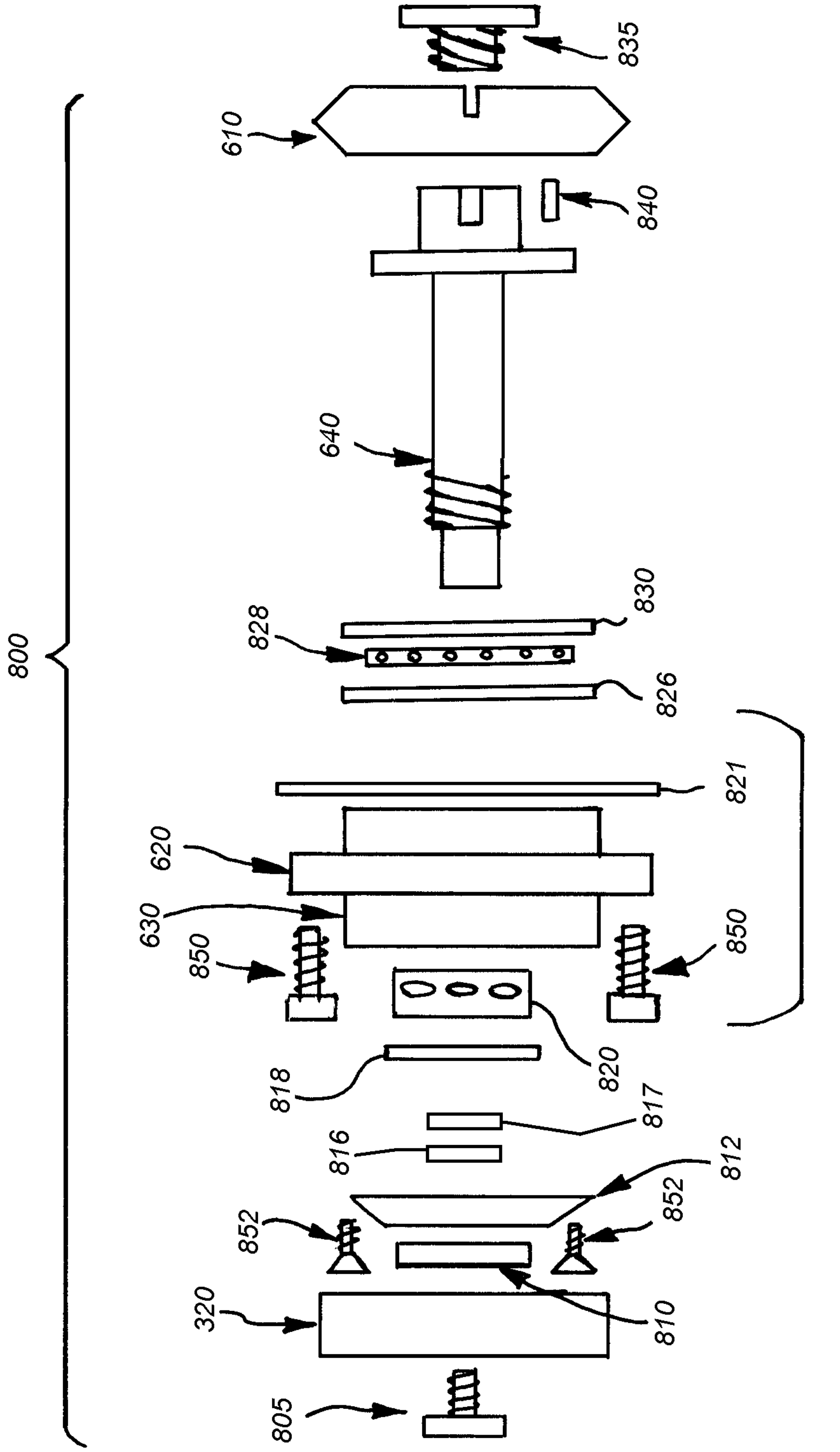
FIG. 8 is an exploded side view of the components of the drive carrier for the side bevel gear, operatively connected to the upper pulley for the belted drive, according to the illustrative embodiment.

Reference is now made to FIG. 8 which is an exploded view detailing the components for a drive carrier assembly 800 for the side spiral bevel gear, according to an illustrative embodiment. The components of the assembly 800 are constructed and arranged to connect the side spiral bevel gear 610 to the upper pulley 320. The arrangement and ordering of components is variable to allow for a desired overall performance. As shown, the pulley 320 is secured to the drive carrier 620 by a bolt 805. A seal 810 and seal cap 812 are provided secured by bolts 852. The lock nuts 816, 817 are pressed together with circlip 818 and a double roller bearing 820 in the drive carrier assembly 800. The carrier 620 is secured to the housing 240 via appropriate bolts 850.

Once fully assembled, the rotation of the beveled gear 610 causes some backlash on the bevel gear. To compensate for this backlash, an O-ring 821 is provided to set bevel gear 610 at a desired location. A thrust bearing 828 and associated thrust washers 826, 830 are provided to compensate for side to side movement of the assembly 800. The bevel gear 610 is secured to the shaft 640 via key 840 (such as a woodruff key) and appropriate bolt 835. The shaft 640 can be a D-shaped shaft or the assembly 800 can include a securing bolt that is secured to the shaft 640 with an appropriate key. The drive carrier assembly 800 provides for the appropriate interconnectivity for the upper pulley 320 to the side bevel gear 610. The upper pulley 320 includes a belted interconnection to the lower pulley 340.

Figure 9:
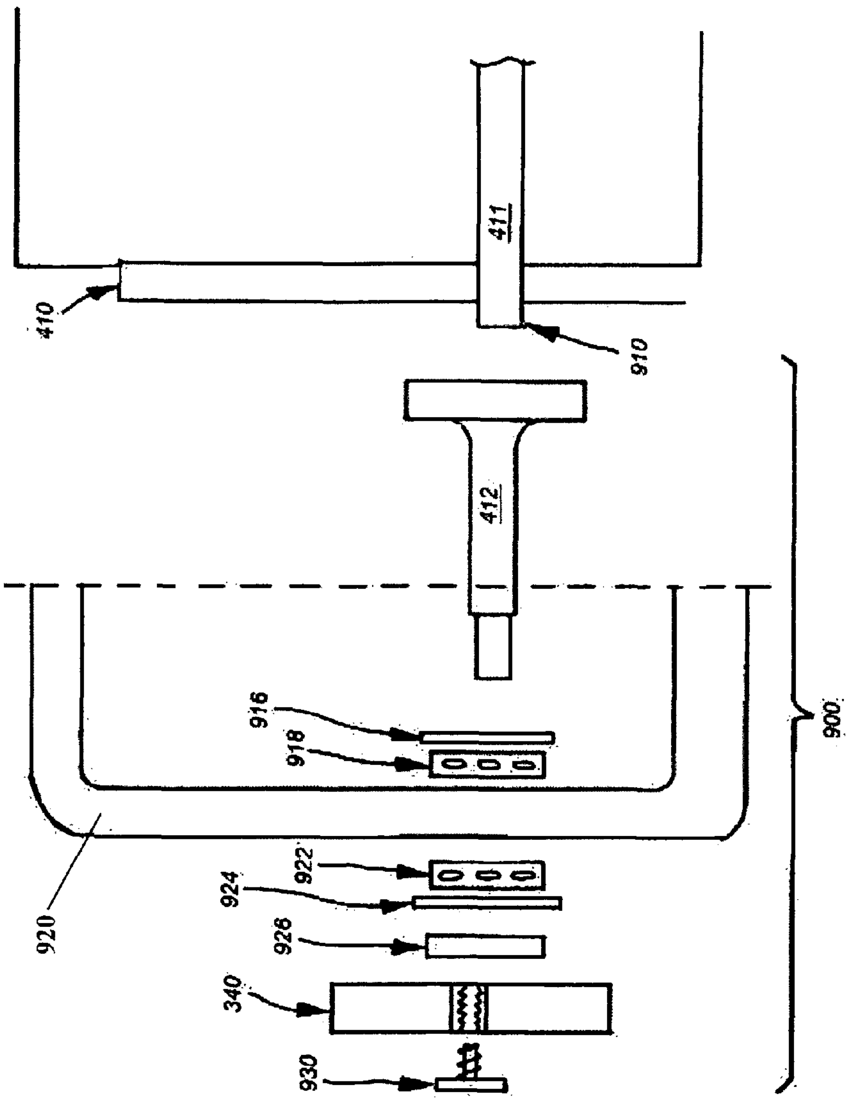
FIG. 9 is an exploded side view of the components for the belted drive assembly lower pulley, and connectivity with the pinion shaft, according to the illustrative embodiment.

Reference is now made to FIG. 9 showing the components of the lower pulley assembly 900 according to the illustrative embodiment. As shown, the engine includes a stock cam plate 410 and pinion shaft 411. To assemble the lower pulley drive assembly 900, the stock gear (not shown) is removed from the pinion shaft 411 and the driveshaft 412 is placed on the pinion shaft 411 at the D-shaped coupling 910. The replaced gear can be either gear-driven or chain-driven, and accordingly the driveshaft is properly constructed and arranged to engage with either type of drive arrangement. The driveshaft 412 can be D-shaped to engage appropriately the pinion shaft 411 or can have a mating end adapted for a key, the mating end can be secured by a bolt 930 to connect the pulley 340 to pinion shaft 411. A roller bearing 918 and associated circlip 916 are provided between the driveshaft 412 and the lower case 920. Similarly, a roller bearing 922 and associated circlip 924, with seal 926, are provided between the pulley 340 and the case 920.

It should be clear that the attachment and adjustment of the illustrative supercharger belted gear drive assembly is fairly straightforward, requiring mainly the removal of original covers, attachment of the intake (430) and drive shaft (412) to the engine components and appropriate adjustment. Repairs and replacement can be accomplished easily as the supercharger components are isolated from the engine and self-contained.

Notably, the use if a roots-type supercharger has the advantage of providing a higher performance unit than a comparably sized turbine supercharger unit. By providing a novel right-angle drive assembly and horizontal-axis pulley and belt assembly, the unit defines a form factor that is suitable for the side of a motorcycle (i.e. vertical rotor axes). This arrangement also allows for isolation of the unit, both mechanically (via a flexible, shock-absorbing drive belt) and physically (via a separate oil bath and gear box) from the motorcycle's engine. The use of pulleys, likewise, allows for greater versatility in setting boost level, and enables such quickly and easily, through the straightforward replacement of pulleys, and readjustment of the tensioner. This renders the design powerful, efficient, easy to install, easy to repair and less-potentially-damaging to the engine in the event of failure.

In operation, the supercharger belted gear assembly is driven by the driveshaft, which turns the belt under tension of the tensioner. This rotates the pulley 320 and interconnected side bevel gear assembly 225. The bevel gear 610 rotates the perpendicular upper bevel gear 425. This turns the supercharger lobes (508, 509) to draw in and ram air into the engine's intake via outlet 430. The greater the RPM of the engine, the greater the boost.

Figure 10:
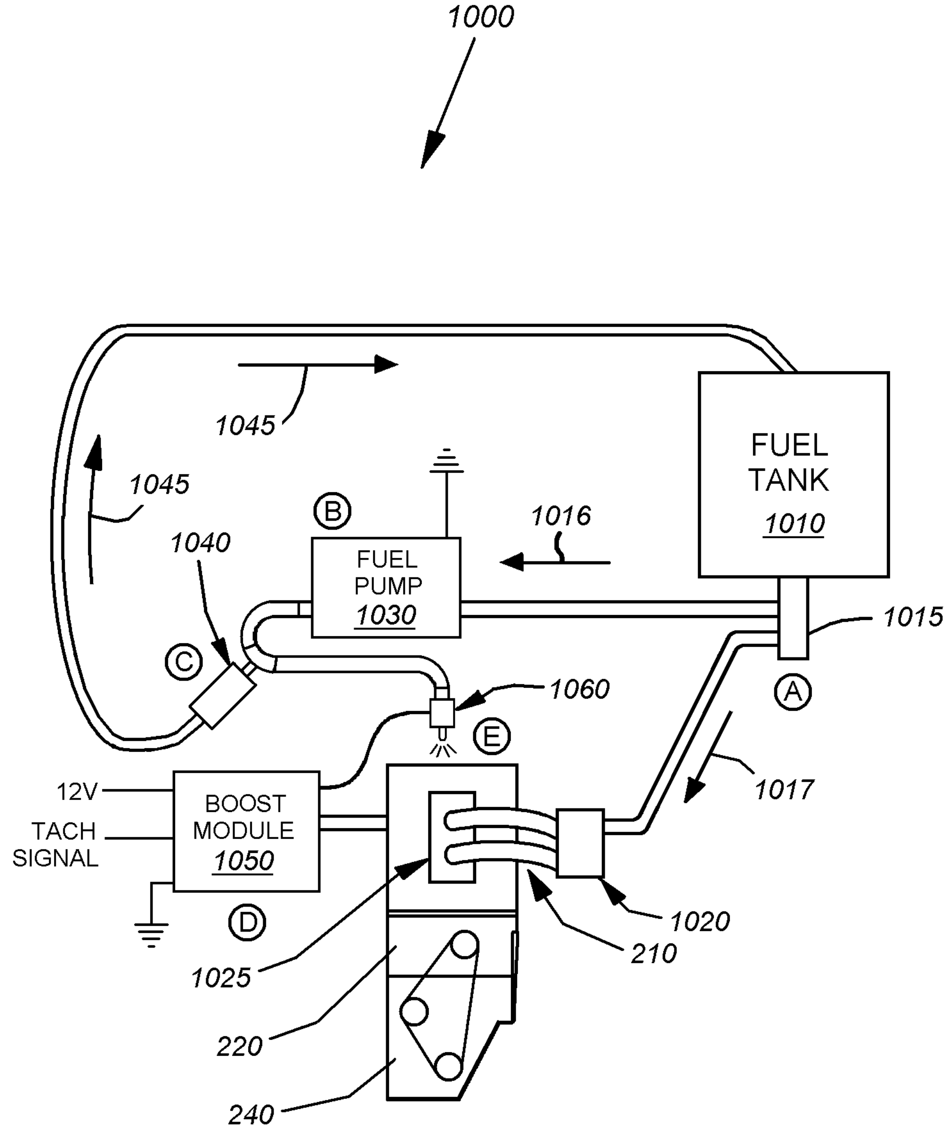
FIG. 10 is a schematic diagram of an auxiliary fuel system and the various components thereof in accordance with an illustrative embodiment.
Figure 11:
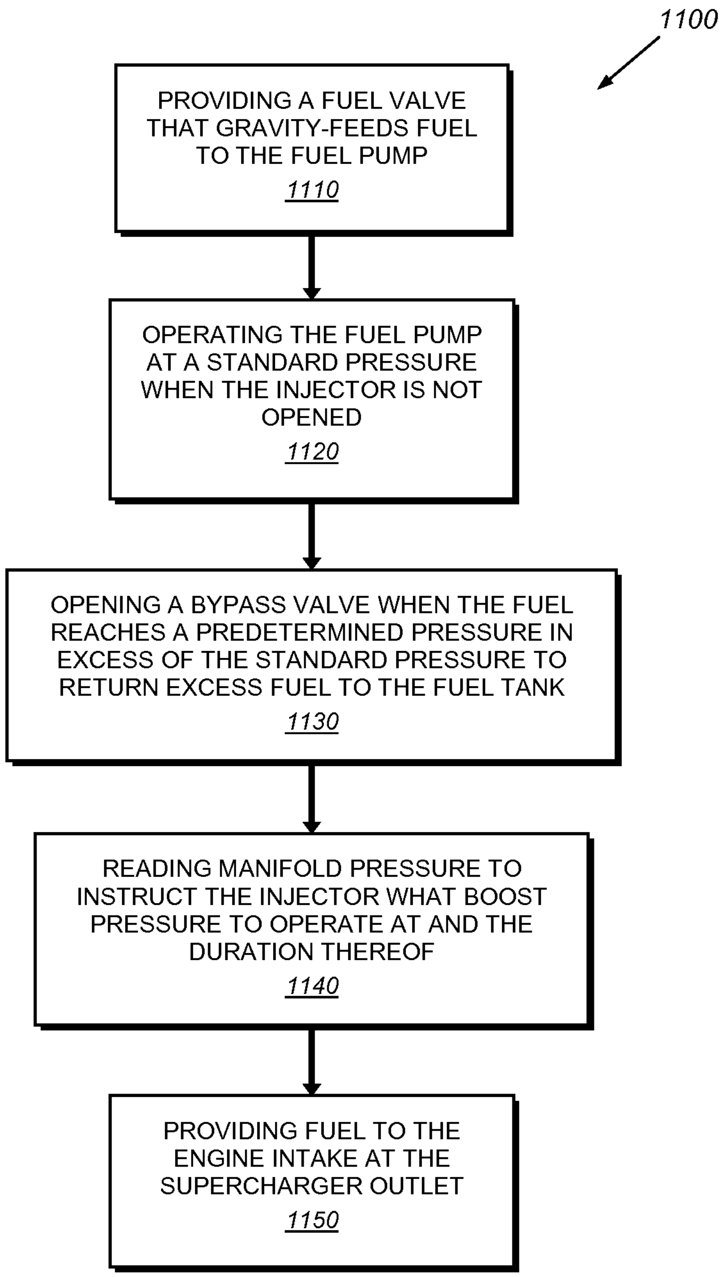
FIG. 11 is a flow chart of a procedure for gas flow throughout the auxiliary fuel system and into the engine, according to the illustrative embodiment.

To further enhance performance of the supercharger, an auxiliary fuel system such as the system shown in FIGS. 10-12 can be employed. The auxiliary fuel system improves the efficiency of the supercharger by providing the precise amount of desirable fuel to the intake of the engine along with the air pressure provided by the supercharger. An auxiliary fuel injector is employed that provides fuel directly to the engine intake, thereby improving overall efficiency and power performance such that air pressure (boost) from the supercharger is forced into the engine intake together with the supplemental fuel from the auxiliary fuel injector. Reference is made to FIGS. 10 and 11, showing, respectively, the system schematic diagram 1000 and associated flow chart for a procedure 1100.*for* fuel flow within the auxiliary fuel system, according to an illustrative embodiment. As shown at step 1110, the fuel is stored in the fuel tank 1010 and a fuel valve 1015 at location A gravity-feeds fuel into the fuel pump 1030 (via arrow 1016). Fuel is also gravity-fed via arrow 1017 to the carburetor 1020 for standard fuel intake into the intake 1025 of the supercharger 210. Conventional fuel systems incorporate a standard fuel system which provides fuel to the carburetor 1020 which is in turn deposited into the supercharger. However, providing too much fuel directly into the supercharger can have undesirable effects on the supercharger, and it is thus desirable to provide fuel directly at the engine intake simultaneously with the boost from the supercharger.

Referring back to FIGS. 10 and 11, the fuel pump 1030 (at location B) operates at a standard pressure when the injector 1060 is not open. This corresponds to step 1120 of the procedure 1100 of FIG. 11. The standard operating pressure for the fuel pump can be approximately 42 psi in illustrative embodiments. As shown in FIG. 10, the fuel pump is operatively connected to a bypass valve 1040 at location C. The bypass valve is constructed and arranged to open when the fuel reaches a predetermined pressure that is in excess of the standard pressure, e.g. 45 psi, so it returns the excess fuel to the fuel tank (via arrows 1045) as step 1130 of procedure 1100 recites. When the auxiliary fuel injector 1060 is open, fuel flows thereto so as to provide sufficient fuel to the engine intake. Although not shown, there is an adapter provided on a back side of the blower that provides fuel injection directly into the intake. An injector on the face of the blower undesirably affects the efficiency of the supercharger because it directs an excess of fuel into the supercharger.

The boost module 1050 (at location D) reads manifold pressure directly at the outlet of the supercharger and incorporates the tach (tachometer) signal reading to determine the amount of boost that the injector 1060 is to operate at and the duration thereof (see step 1140 of procedure 1100). Reading the manifold pressure at the outlet of the supercharger allows the boost module to determine the precise amount of pressure being directed into the engine intake and to determine the amount of fuel as appropriate. Moreover, the boost module The injector 1060 is placed at the supercharger outlet (location E) to provide sufficient gas for the engine along with the boost of air pressure from the supercharger. As shown at step 1150 of the procedure, fuel is provided to the engine intake at the supercharger outlet. The boost module allows fuel amounts to be fine-tuned for specific applications as readily apparent to those having ordinary skill. The boost module also allows fuel to be added throughout the entire RPM range as well as in small burst when desired. For example, specific RPM values can be pin-pointed and tuned to provide extra fuel when desired to further increase combustion and overall performance of the engine. By measuring the boost output by the supercharger, the amount of fuel can be precisely regulated to prevent overfueling into the supercharger and/or underfueling into the supercharger.

The provision of an auxiliary fuel system that incorporates a fuel injector directly at the engine intake (which is provided with the outlet of the supercharger) provides improved efficiency over conventional carburetion and/or fuel-injection systems. Conventional fuel systems incorporate levels of fuel based upon the RPMs of the engine. However, this has several disadvantages because there is a lag of time between the RPM values and the amount of boost created by the supercharger. Also this does not address providing fuel directly to the intake. Accordingly it is highly desirable to measure the manifold pressure at the outlet of the supercharger and to adjust the level of fuel accordingly. Conventional supercharger systems typically do not exceed an efficiency of approximately 60% in a best scenario because of the fuel mixture coming into the supercharger and the lack of compensation for fuel at the intake of the engine. The auxiliary fuel system as described herein produces a supercharger efficiency of approximately 80% which is significantly increased as compared to conventional fuel systems. This is due in part to the simultaneous delivery of supplemental fuel with the boost directly into the engine intake, and also in part to the measurement of boost at the supercharger outlet to precisely fine-tune the amount of fuel distributed into the engine intake. Note that both carburetor systems and fuel-injection systems can employ this auxiliary fuel system, as it is a supplement to the conventional fuel system of a motorcycle engine and does not impact the existing fuel system. The supercharger forces more fuel into the engine alone with the air from the supercharger itself, through use of an auxiliary fuel injector.

Reference is now made to FIG. 12 showing a motorcycle 1200 with the fully-assembled supercharger and associated gear drive system according to the illustrative embodiments described herein. As shown, the supercharger 210 is mounted on the motorcycle 1200. The gear drive system includes the gear drive assembly housing 220 and lower belt drive assembly housing 240, and the associated interconnections therebetween, which are not numbered in this figure so that the overall system is more readily viewable. As shown, the gear drive assembly housing 220 includes a pressure relief valve 226 for relieving any excess pressure within the system. Also note the fuel tank 1010 with appropriate interconnections to the carburetor 1020 with an air filter 1220 therebetween. The intake 1025 of the supercharger 210 is shown fully assembled on the supercharger 210 and is operatively connected to the conventional fuel system as including the carburetor 1020. The motorcycle 1200 also includes the auxiliary fuel system, although not specifically shown, which provides a further fuel injector at the supercharger outlet which provides fuel directly to the engine intake along with the air pressure form the supercharger outlet.

The construction and arrangement of various supercharger and associated gear drive system components should now be readily apparent to those having ordinary skill. Although the supercharger has been shown and described on an exemplary HARLEY-DAVIDSON Twin-Cam motorcycle with other example motorcycles including the V-Rod, the teachings herein are readily applicable to other motorcycles and/or engine types to produce the supercharging, gear drive assembly systems and auxiliary fuel systems as described herein without departing from the teachings herein.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, while a motorcycle is presented, different engines or vehicles can employ the teachings herein. The size and shape of the supercharger and associated components and covers are highly variable to accommodate the various engines and/or vehicles to be supercharged. The cover plate for the belt driven assembly can be designed to provide an aesthetic appearance or particular structure for a vehicle. Accordingly, this description is meant to be taken only by way of example, and not to otherwise limit the scope of this invention.

What is claimed is:

1. A method for supercharging an engine, the engine having a supercharger operatively connected to an intake of the engine, the method comprising the steps of:

providing a fuel valve that gravity-feeds fuel to a fuel pump;

operating the fuel pump at a standard pressure when an auxiliary fuel injector is not opened, the auxiliary fuel injector being operatively connected town intake of the engine to provide a supplementary level of fuel directly to the intake of the engine;

opening a bypass valve when the fuel reaches a predetermined pressure in excess of the standard pressure to return excess fuel to a fuel tank;

reading a manifold pressure at an outlet of the supercharger to instruct the auxiliary fuel injector at what boost pressure to operate and the duration thereof; and providing fuel directly to the intake of the engine via the auxiliary fuel injector disposed proximate the outlet of the supercharger.

2. The method of claim 1 wherein the standard pressure is 42 psi and the predetermined pressure is 45 psi.

3. A gear drive assembly for supercharging an engine, the gear drive assembly comprising:

a pulley arrangement comprising an upper pulley and a lower pulley, wherein said upper pulley is belt-driven by said lower pulley and said lower pulley is operatively connected to a shaft of the engine;

a first bevel gear belt-driven by said pulley arrangement and operatively connected to said upper pulley of said pulley arrangement;

a second bevel gear engaged by said first bevel gear, said second bevel gear rotationally interconnected with lobes of a roots rotor-type supercharger to induce rotation of the supercharger;

a lubrication system, wherein said lubrication system is self-contained and distinct from an existing lubrication system of the engine; and a housing of said gear drive assembly, wherein said housing houses said first bevel gear, said second bevel gear, and said lubrication system.

4. The gear drive assembly of claim 1 wherein said housing includes a collection well to ensure proper lubrication of said gear drive assembly.

5. The gear drive assembly of claim 1 wherein the shaft of the engine is a pinion shaft.

6. The gear drive assembly of claim 1 wherein the shaft of the engine is a cam shaft.

7. A system for supercharging an engine; the system comprising:

a gear drive assembly for supercharging the engine, the gear drive assembly including a first bevel gear belt-driven by a pulley arrangement operatively connected to a rotating shaft of the engine; and a second bevel gear engaged by the first bevel gear, the second bevel gear rotationally interconnected with a lobe of a roots rotor-type supercharger to induce rotation of the supercharger;

an auxiliary fuel system operatively connected to an outlet of the supercharger to determine the manifold pressure being output by the supercharger, the auxiliary fuel system including a boost module operatively connected to the outlet of the supercharger to determine an output boost of the supercharger; and an auxiliary fuel injector operatively connected to the boost module that receives instructions from the boost module corresponding to the output boost of the supercharger and an amount of fuel to be injected into an intake of the engine by the auxiliary fuel injector.

8. The system of claim 7 further comprising:

a bypass valve operatively connected between the auxiliary fuel injector and a fuel pump, wherein the fuel pump operates at a standard pressure and the bypass valve is constructed and arranged to open when it detects a predetermined pressure that is in excess of the standard pressure to thereby return excess fuel to a fuel tank while enabling fuel under the standard pressure to flow to the auxiliary fuel injector.

9. The system of claim 7 wherein the supercharger comprises a roots rotor-type supercharger including at least two opposing lobes for generating air pressure therein.

10. The system of claim 7 wherein the rotating shaft of the engine is at, least one of a pinion shaft of the engine and a cam shaft of the engine.

* * * * *